(12) United States Patent
Stahlnecker

(10) Patent No.: US 7,735,587 B1
(45) Date of Patent: Jun. 15, 2010

(54) HAND TRUCK DRIVING APPARATUS

(76) Inventor: Todd D. Stahlnecker, 18617 S. Grasle Rd., Oregon City, OR (US) 97045

( * ) Notice: Subject to any disclaimer, the term of this patent is extended or adjusted under 35 U.S.C. 154(b) by 203 days.

(21) Appl. No.: 12/028,478

(22) Filed: Feb. 8, 2008

(51) Int. Cl.
*B62D 51/04* (2006.01)
*B62B 1/10* (2006.01)

(52) U.S. Cl. .................. 180/19.1; 180/11; 180/16; 280/467; 280/47.131; 280/47.27; 280/47.34; 280/47.2

(58) Field of Classification Search ............ 180/19.1, 180/11, 16; 280/467, 47.131, 47.27, 47.34, 280/47.2
See application file for complete search history.

(56) References Cited

U.S. PATENT DOCUMENTS

| | | | |
|---|---|---|---|
| 3,907,138 A | 9/1975 | Rhodes | |
| 6,062,328 A | 5/2000 | Campbell et al. | |
| 6,474,427 B1 * | 11/2002 | Tunnecliff | 180/19.1 |
| D481,512 S | 10/2003 | Lee | |
| 6,907,949 B1 | 6/2005 | Wang | |
| 7,000,933 B2 | 2/2006 | Arling et al. | |
| 7,032,694 B2 * | 4/2006 | Jessen | 180/19.1 |
| 7,163,213 B2 | 1/2007 | Chambers | |
| 7,461,809 B1 * | 12/2008 | Maley | 242/557 |
| 2005/0230928 A1 | 10/2005 | Raney | |

\* cited by examiner

*Primary Examiner*—Lesley Morris
*Assistant Examiner*—Marlon A Arce

(57) ABSTRACT

A hand truck driving apparatus includes a dolly that has a frame having a bottom end, a top end and pair of lateral sides. A plate is attached to the frame adjacent to the bottom end and extends forward of the frame. A stabilizer is attached to and extends rearward of the frame. A pair of support wheels is rotatably attached to the stabilizer adjacent to the bottom end of the frame. A drive platform is removably attached to the dolly. A drive apparatus is mounted on the drive platform. The drive apparatus moves the drive platform and the dolly when the drive apparatus is actuated.

8 Claims, 9 Drawing Sheets

HAND TRUCK DRIVING APPARATUS

BACKGROUND OF THE INVENTION

Field of the Invention

The present invention relates to hand truck moving devices and more particularly pertains to a new hand truck moving device for assisting a person in moving a dolly.

SUMMARY OF THE INVENTION

The present invention meets the objectives presented above by generally comprising a dolly that has a frame having a bottom end, a top end and pair of lateral sides. A plate is attached to the frame adjacent to the bottom end and extends forward of the frame. A stabilizer is attached to and extends rearward of the frame. A pair of support wheels is rotatably attached to the stabilizer adjacent to the bottom end of the frame. A drive platform is removably attached to the dolly. A drive apparatus is mounted on the drive platform. The drive apparatus moves the drive platform and the dolly when the drive apparatus is actuated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
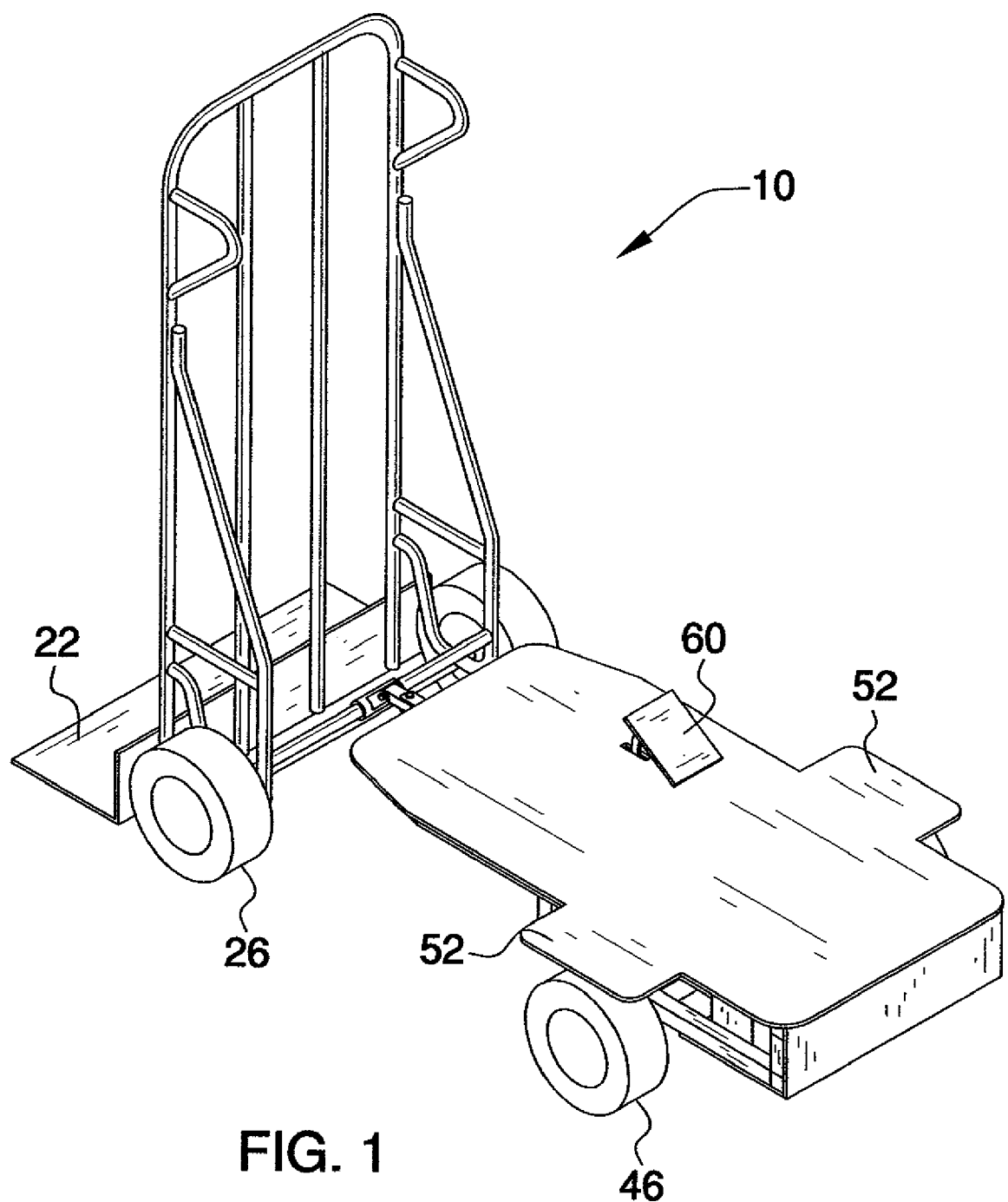
FIG. 1 is a perspective view of a hand truck driving apparatus according to the present invention.
Figure 2:
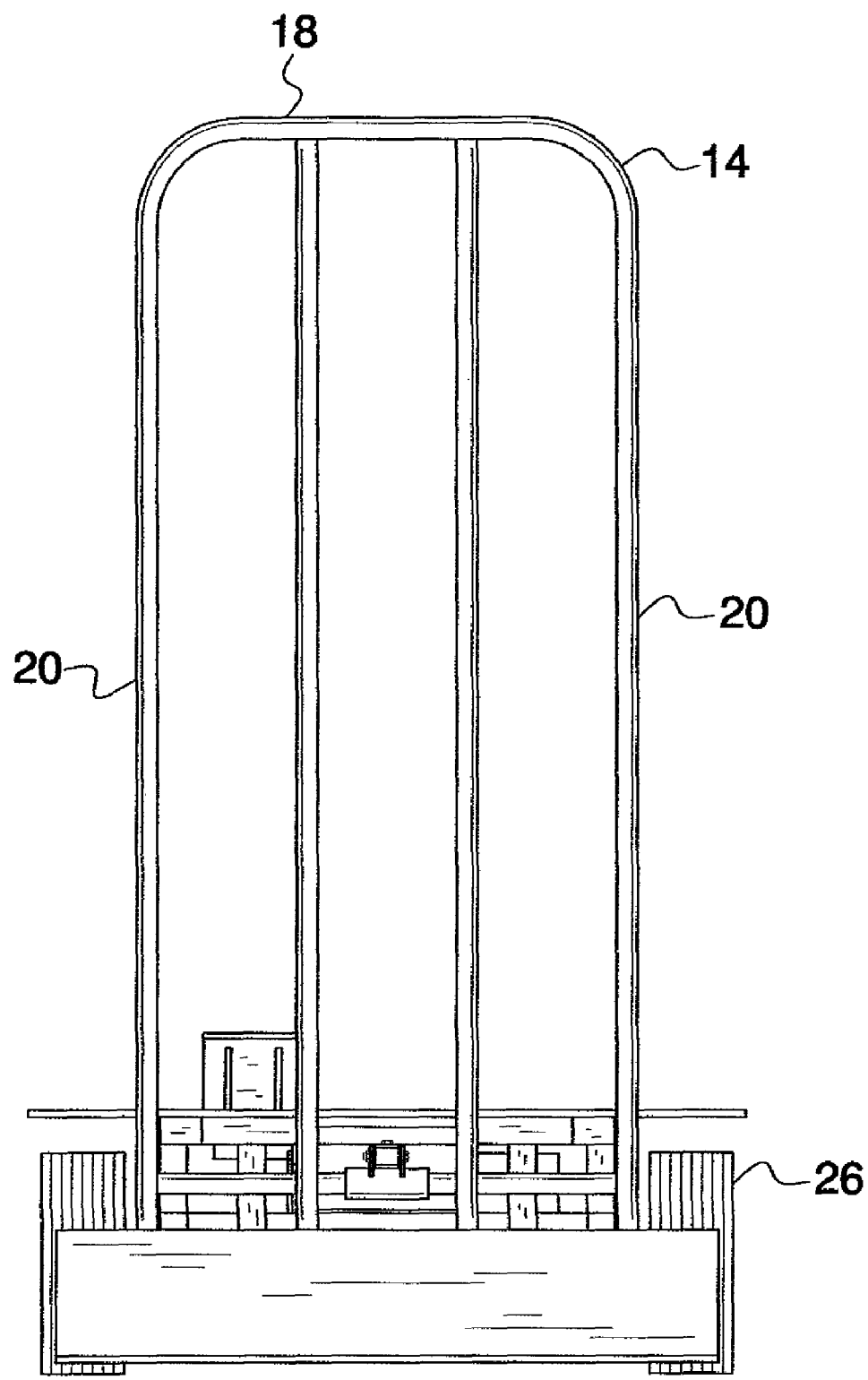
FIG. 2 is a front view of the present invention.
Figure 3:
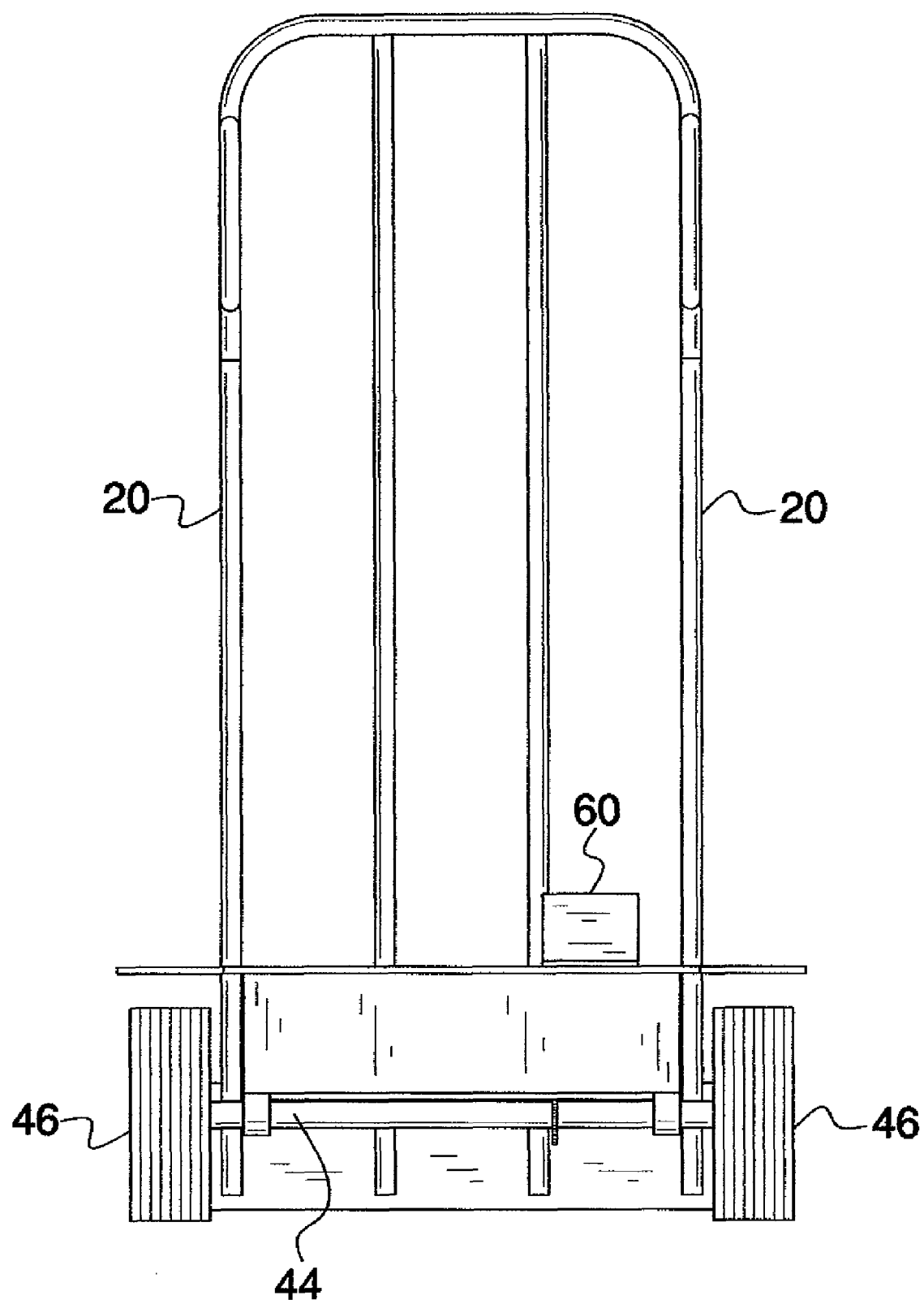
FIG. 3 is a rear view of the present invention.
Figure 4:
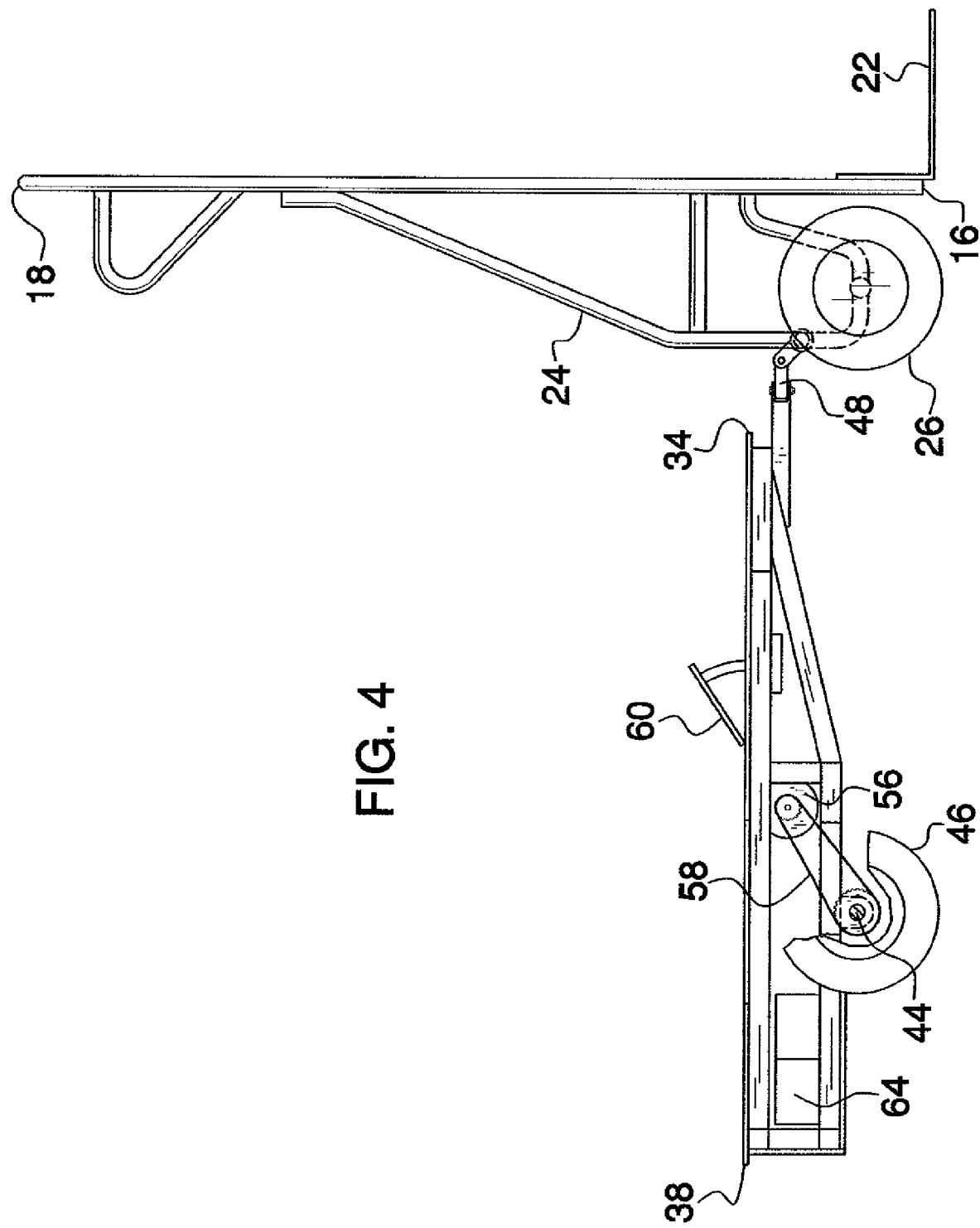
FIG. 4 is a side broken view of the present invention.

With reference now to the drawings, and in particular to FIGS. 1 through 10 thereof, a new hand truck moving device embodying the principles and concepts of the present invention and generally designated by the reference numeral 10 will be described.

As best illustrated in FIGS. 1 through 10, the hand truck driving apparatus 10 generally comprises a conventional dolly 12 that has a frame 14 having a bottom end 16, a top end 18 and pair of lateral sides 20. A plate 22 is attached to the frame 14 adjacent to the bottom end 16 and extending forward of the frame 14. A stabilizer 24 is attached to and extends rearward of the frame 14. A pair of support wheels 26 is rotatably attached to the stabilizer 24 adjacent to the bottom end 16 of the frame 14.

A drive platform 28 is removably attached to the dolly 12. The drive platform 28 includes a panel 29 that has a top side 30, a bottom side 32, a front edge 34, a rear edge 38, a first lateral edge 40 and a second lateral edge 42. An axle 44 is attached to the panel 29 and extends between the first 40 and second 42 lateral edges. A pair of drive wheels 46 is attached to the axle 44. Each of the first 40 and second 42 lateral edges has one of the drive wheels 46 positioned adjacent thereto. A connector 48 is attached to the panel 29 and extends forward of the front edge 34. The connector 48 is removably attached to the stabilizer 24. The stabilizer 24 may include a horizontally oriented connecting rod 50 to which the connector 48 is attached to. The connector 48 is pivotally coupled to the stabilizer 24 such that the frame 14 can be rotated and titled with respect to the platform 28. The panel 29 and dolly 12 are supported solely by the drive wheels 46 and the support wheels 26 when the dolly 12 is tilted back toward the panel 29 and the plate 22 is lifted off of a ground surface.

A pair of shields 52 is attached to the panel 29. Each of the shields 52 extends over one of the drive wheels 46 to protect a user of the assembly 10 from the drive wheels 46. The drive platform 28 has a height less than 2 feet, a width from the first lateral edge 40 to the second lateral edge 42 less than 4 feet, and a length from the front edge 34 to the rear edge 38 less than 6 feet.

A drive apparatus 54 is mounted on the drive platform 28. The drive apparatus 54 moves the drive platform 28 and the dolly 12 when the drive apparatus 54 is actuated. The drive apparatus 54 includes a motor 56 that is mounted to the panel 29 and is mechanically coupled to the axle 44 by a drive chain 58. The motor 56 rotates the axle 44 when the motor 56 is engaged. The motor 56 comprises an electric motor and is attached to the bottom side 32 of the panel 29. An actuator 59 is in, communication with the motor 56 and engages the motor 56 when the actuator 59 is actuated. The actuator 59 comprises a pedal 60 mounted on the top side 30 of the panel 29. A power source 62 is electrically coupled to the motor. The power source 62 comprises at least one battery 64, which is preferably a rechargeable battery, mounted to the panel 29.

Figure 5:
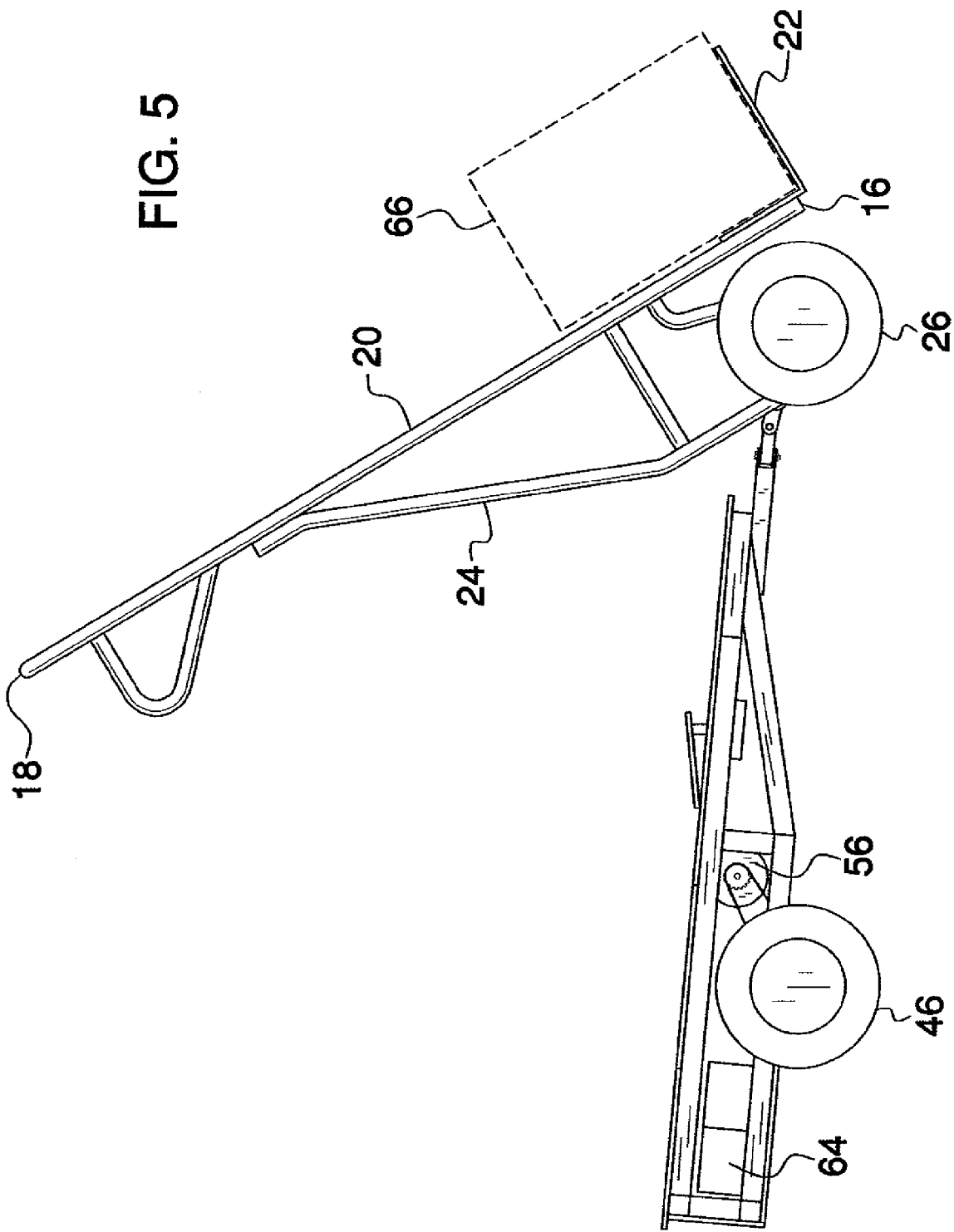
FIG. 5 is a side in-use view of the present invention.
Figure 6:
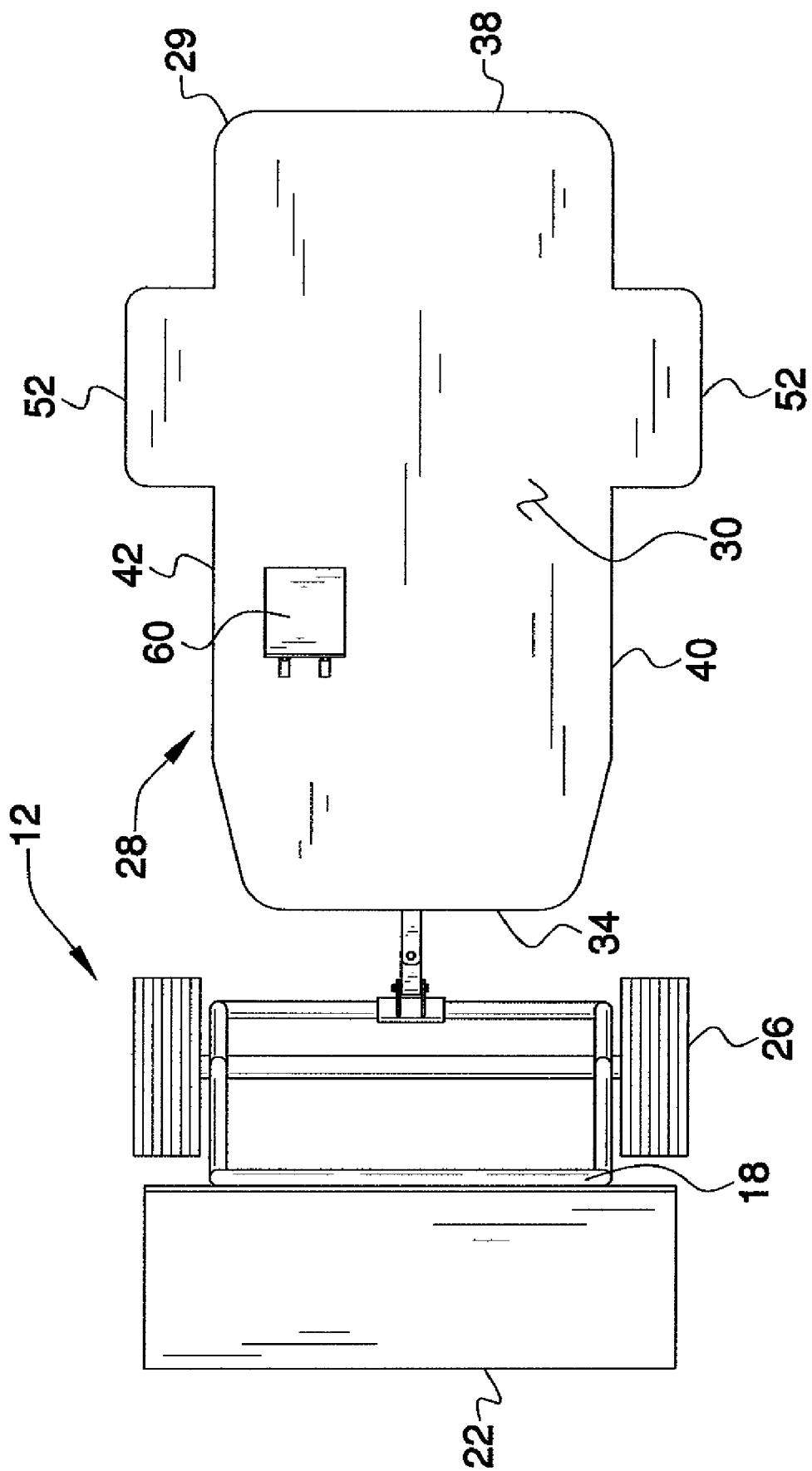
FIG. 6 is a top view of the present invention.
Figure 7:
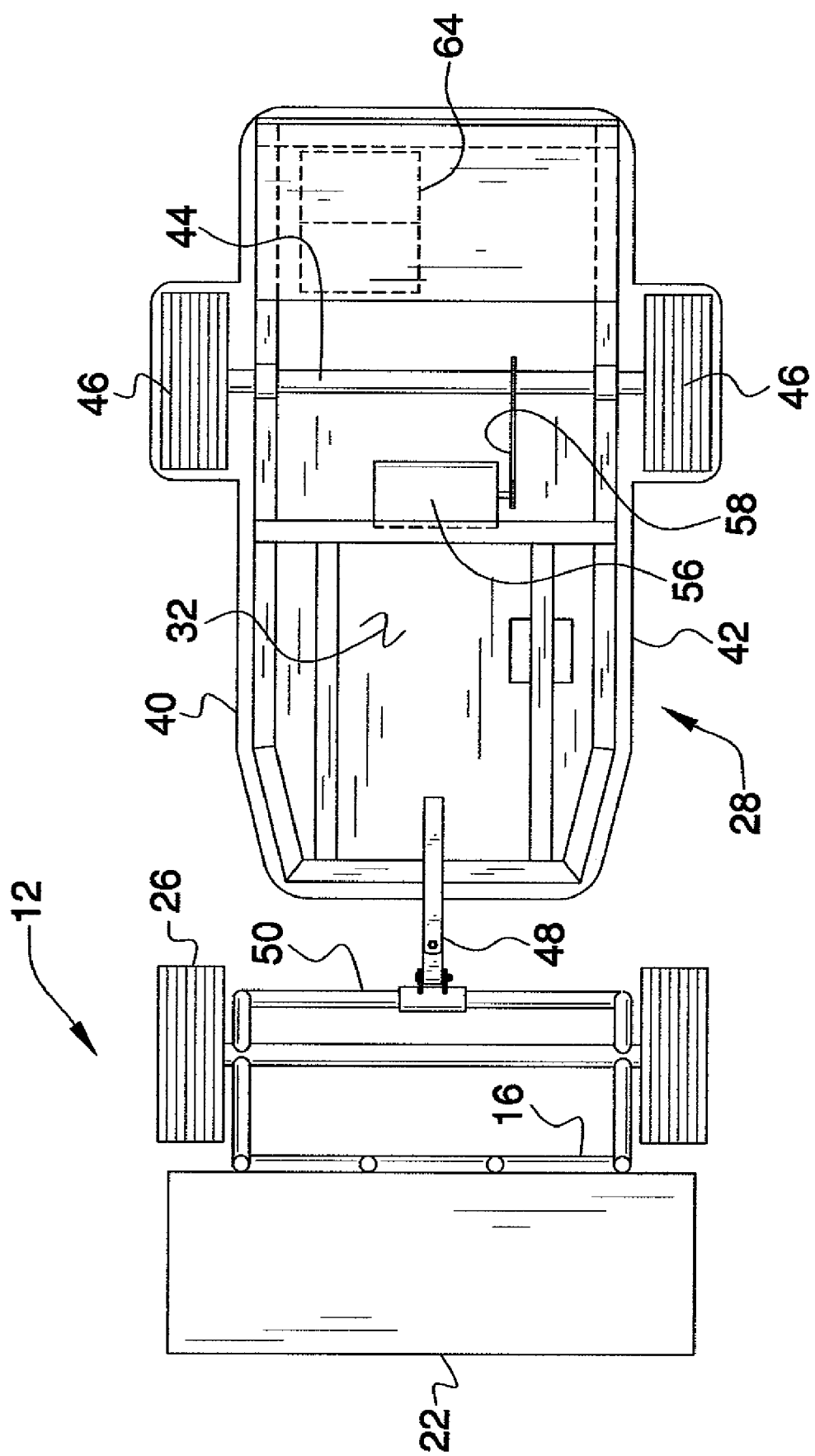
FIG. 7 is a bottom view of the present invention.
Figure 8:
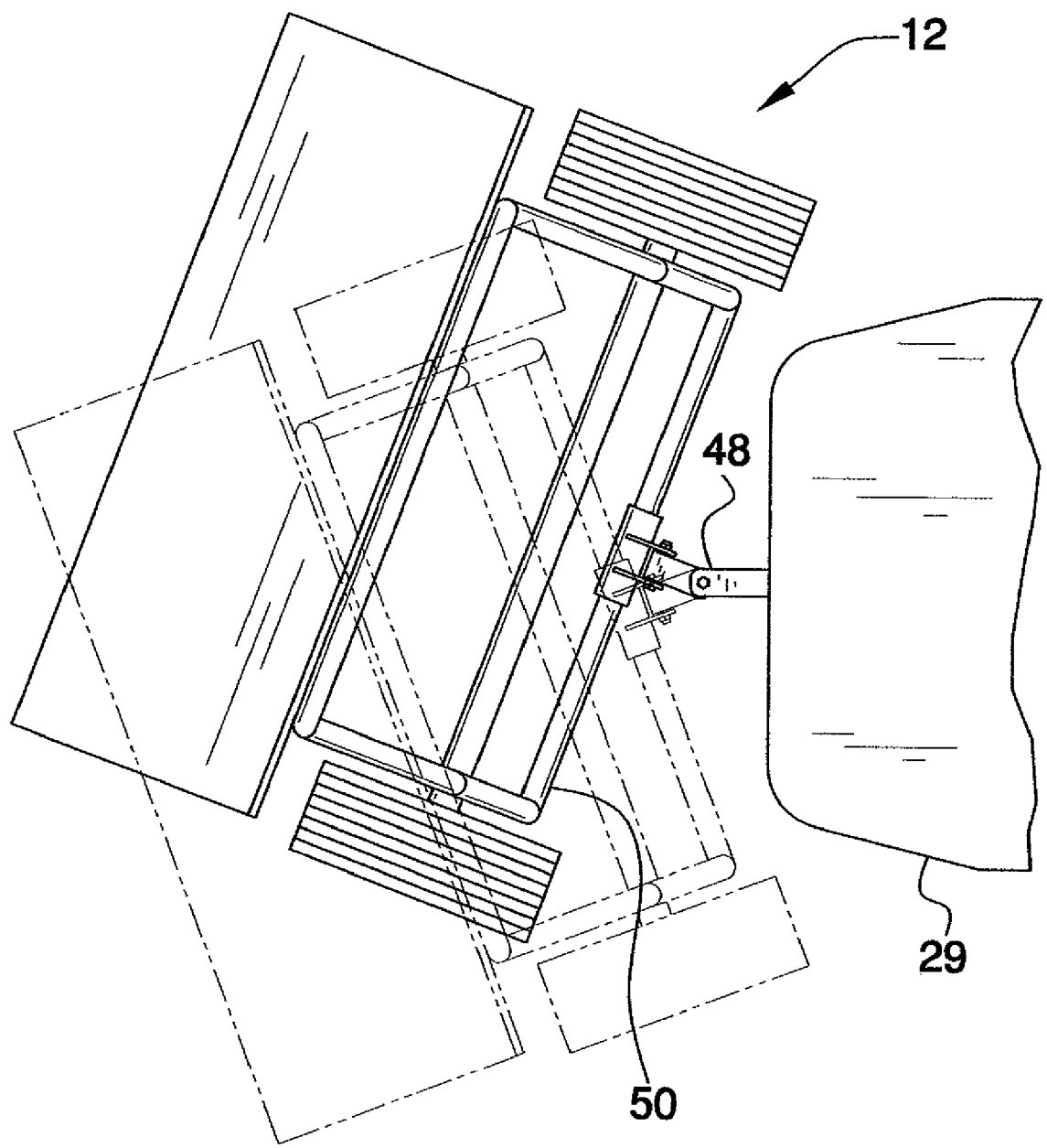
FIG. 8 is a top broken view of the present invention.
Figure 9:
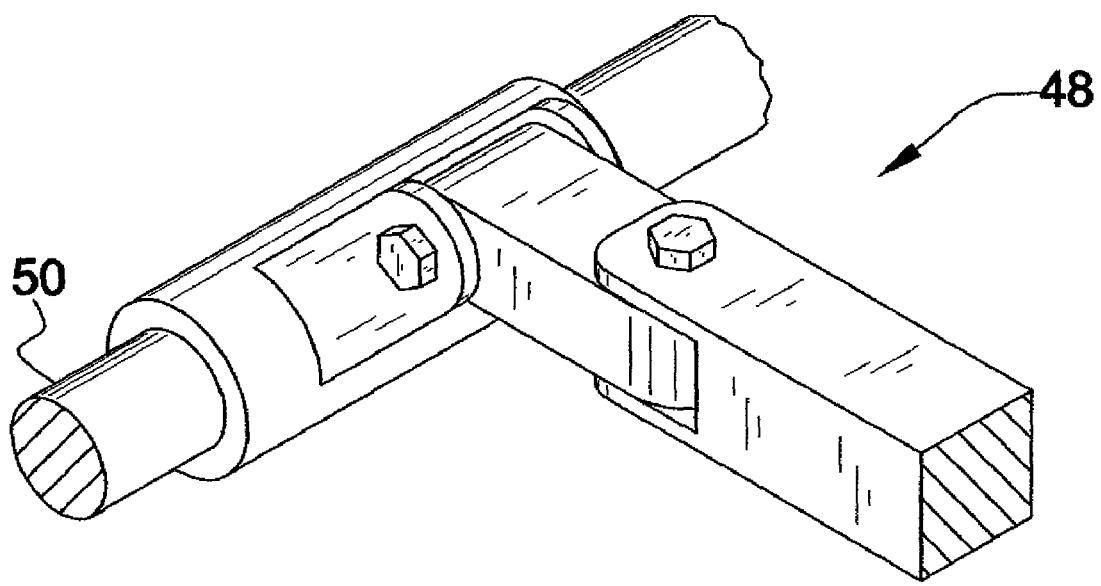
FIG. 9 is an enlarged perspective view of a connector of the present invention.
Figure 10:
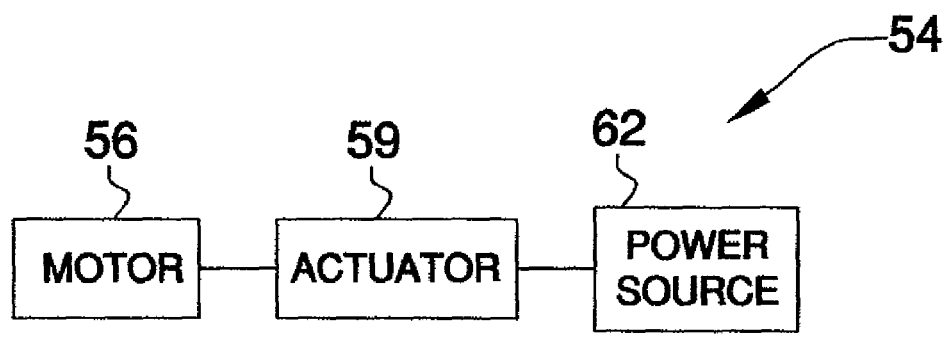
FIG. 10 is a schematic view of the present invention.

In use, the plate 22 is extended under a load 66 to be moved, either with or without the drive platform 28 attached to the dolly 12. The dolly 12 is tilted backward as shown in FIG. 5 so that the support wheels 26 and the drive wheels 46 create a support combination that is supporting the load 66, the dolly 12 and the drive platform 28. The actuator 59 is used to cause the motor 56 to rotate the axle 44 and in turn rotate the drive wheels 46. The dolly 12 is rotated, as needed, to steer the assembly 10 and move the load 66 where needed. The actuator 59 and motor 56 may include both reverse and forward functions.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand truck driving assembly comprising:
   a dolly having a frame having a bottom end, a top end and pair of lateral sides, a plate being attached to said frame adjacent to said bottom end and extending forward of said frame, a stabilizer being attached to and extending rearward of said frame, a pair of support wheels being rotatably attached to said stabilizer adjacent to said bottom end of said frame;
   a drive platform being removably attached to said dolly, said drive platform including;
      a panel having a top side, a bottom side, a front edge, a rear edge, a first lateral edge and a second lateral edge;
      an axle being attached to said panel and extending between said first and second lateral edges;
      a pair of drive wheels being attached to said axle, each of said first and second lateral edges having one of said drive wheels positioned adjacent thereto;
      a connector being attached to said panel and extending forward of said front edge, said connector being removably attached to said stabilizer, said connector being pivotally coupled to said stabilizer such that said frame can be rotated and titled with respect to said drive platform, said panel and said dolly being supported solely by said drive wheels and said support wheels when said dolly is tilted back toward said panel and said plate is lifted off of a ground surface;
   a drive apparatus being mounted on said drive platform, said drive apparatus moving said drive platform and said dolly when said drive apparatus is actuated.

2. The assembly according to claim 1, wherein said drive apparatus includes:
   a motor being mounted to said panel and being mechanically coupled to said axle, said motor rotating said axle when said motor is engaged; and
   an actuator being in communication with said motor, said actuator engaging said motor when said actuator is actuated.

3. The assembly according to claim 2, wherein said motor comprises an electric motor, a power source being electrically coupled to said motor.

4. The assembly according to claim 3, wherein said power source comprises at least one battery mounted to said panel.

5. The assembly according to claim 2, wherein said actuator comprises a pedal mounted on said top side of said panel.

6. The assembly according to claim 1, further including a pair of shields being attached to said panel, each of said shields extending over one of said drive wheels.

7. The assembly according to claim 1, wherein said drive platform has a height less than 2 feet, said drive platform having a width from said first lateral edge to said second lateral edge less than 4 feet, said drive platform having a length from said front edge to said rear edge less than 6 feet.

8. A hand truck driving assembly comprising:
   a dolly having a frame having a bottom end, a top end and pair of lateral sides, a plate being attached to said frame adjacent to said bottom end and extending forward of said frame, a stabilizer being attached to and extending rearward of said frame, a pair of support wheels being rotatably attached to said stabilizer adjacent to said bottom end of said frame;
   a drive platform being removably attached to said dolly, said drive platform including;
      a panel having a top side, a bottom side, a front edge, a rear edge, a first lateral edge and a second lateral edge;
      an axle being attached to said panel and extending between said first and second lateral edges;
      a pair of drive wheels being attached to said axle, each of said first and second lateral edges having one of said drive wheels positioned adjacent thereto;
      a connector being attached to said panel and extending forward of said front edge, said connector being removably attached to said stabilizer, said connector being pivotally coupled to said stabilizer such that said frame can be rotated and titled with respect to said drive platform, said panel and said dolly being supported solely by said drive wheels and said support wheels when said dolly is tilted back toward said panel and said plate is lifted off of a ground surface;
   a drive apparatus being mounted on said drive platform, said drive apparatus moving said drive platform and said dolly when said drive apparatus is actuated, said drive apparatus including;
      a motor being mounted to said panel and being mechanically coupled to said axle, said motor rotating said axle when said motor is engaged, said motor comprising an electric motor, said motor being attached to said bottom side of said panel;
      an actuator being in communication with said motor, said actuator engaging said motor when said actuator is actuated, said actuator comprising a pedal mounted on said top side of said panel;
      a power source being electrically coupled to said motor, said power source comprising at least one battery mounted to said panel;
   a pair of shields being attached to said panel, each of said shields extending over one of said drive wheels; and
   said drive platform having a height less than 2 feet, said drive platform having a width from said first lateral edge to said second lateral edge less than 4 feet, said drive platform having a length from said front edge to said rear edge less than 6 feet.

\* \* \* \* \*